J. T. Turner.
Sharpening Reciprocating Saws.
Nº 17,458. Patented June 2, 1857.
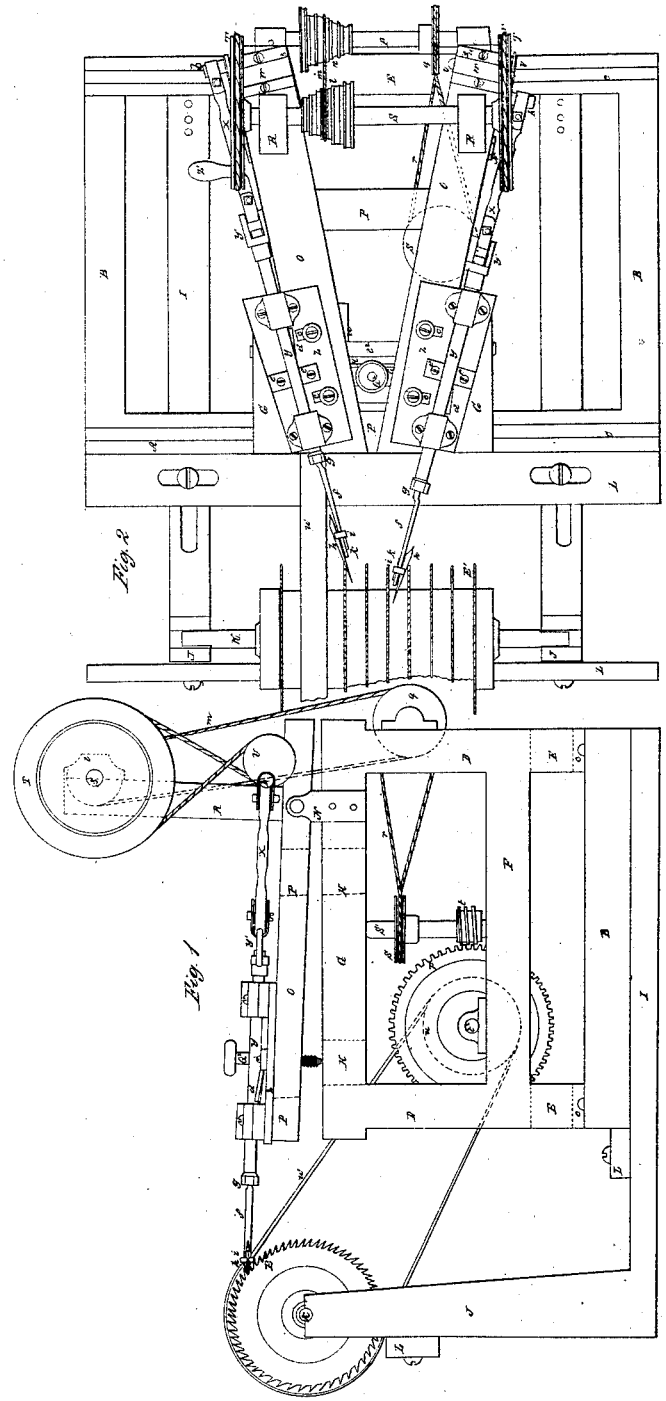

UNITED STATES PATENT OFFICE.

JONATHAN T. TURNER, OF BRIDGEWATER, MASSACHUSETTS.

MACHINE FOR FILING SAWS FOR COTTON-GINS.

Specification of Letters Patent No. 17,458, dated June 2, 1857.

*To all whom it may concern:*

Be it known that I, JONATHAN T. TURNER, of Bridgewater, in the county of Plymouth and State of Massachusetts, have invented certain new and useful improvements in machines for filing saws for cotton-gins and for pointing the teeth of such saws which have been made dull by use; and I do hereby declare that the same are described and represented in the following specification and drawings.

To enable others skilled in the art to make and use my improvements I will proceed to describe their construction and operation referring to the drawings in which the same letters indicate like parts in each of the figures.

Figure 1 is a side elevation, and Fig. 2 a plan of a machine with by improvements.

The nature of my invention and improvements in machines for filing cotton gin saws and repointing the teeth of those which have become dull from use consists in certain devices which give the files a reciprocating rolling motion, so as to repoint or sharpen the teeth by filing off the back and sides, while the saws have a continuous rotary motion, which causes the file to slip over the point of the tooth sharpened onto the next tooth, and so on in succession until the whole are sharpened, and in arranging the devices which operate the files upon an adjustable vibrating frame so as to adjust the files to a proper height to suit the saws being filed; also in giving the saws a continuous rotary motion while they are operated upon by the files by means of proper devices arranged for that purpose; and further in giving a reciprocating rotary motion to a spring file holder, so as to make it file and point the teeth of the saws in a proper manner; lastly in arranging the machinery that operates the files or the supports of the ginning saw cylinder upon ways, so that one or the other can be traversed to adjust the files to all the saws in the cylinder.

In the accompanying drawings A, A, are the sides and B, B, the ends of a rectangular frame upon which the machine stands and traverses on the ways C, C, fastened to the sides A, A.

The traversing frame of the machine consists of four posts D, D, connected by the cross bars E, E, and side bars F, and also by the rails G, G, which rails are connected by the cross bars H, H, shown by broken lines in Fig. 1, as are also the bars E, E.

In order to support the saw shaft with the saws E′ E′ upon it as it is taken from the gin I fasten two vibrating bars I, I, to the rear of the rectangular frame, which bars extend a proper distance beyond the opposite side of the frame and have two posts J, J, fastened in them with scores in their upper ends for the journals of the saw shaft K to turn in. These posts J, J and bars I, I, may be moved and adjusted to suit the length of the saw shaft K, and fastened by screws in the bars L, L. The saws E′, E′, are arranged and fastened to or upon the shaft K, in the usual manner. The bars I, I, may be adjusted under the bars A, A, so as to bring the saws in a proper position under the files as required.

There is a vibrating frame arranged on two pivots which turn in stands fastened to the rails G, G, one of which stands is shown at N, Fig. 1. This vibrating frame consists of two side bars O, O, and cross bars P, P, fastened together in the form shown in Fig. 2, so as to make a strong stiff frame, and it has the bar Q fastened across it near the narrow end, which bar is provided with a female screw for the hand screw $Q^2$, which works against a plate in the bar H, when the screw is turned to adjust the frame and files to the required height upon the saws to be filed to suit the angle or pitch of the teeth. Near the wide end of this vibrating frame two posts R, R, are fastened to support the journals of the shaft S, to which shaft a gear or pulleys may be applied to operate the machine. This shaft S, carries two pulleys T, T, which drive the crank pulleys and shafts U, U, by the bands V, V, shown in the drawing. These crank shafts turn in boxes W, W, fastened to the bars O, O, and are retained in the boxes by the points of the screws a, a, which screw through the boxes into scores in the shafts for that purpose. The crank pins b, b, in the pulleys V, carry the connecting rods X, X, which operate the traverse rods Y, Y, which traverse in the stands Z, Z, fastened to the bars O, O, by screws through the slots c, c. The traverse rods Y, are provided with crossheads Y′, Y′, to which the connecting rods are attached, which crossheads are so arranged that the traverse rods can roll or turn in them, as they are traversed, the rods being provided with feathers or splines $d, d,$ arranged spirally, so as to give the rods a rolling motion as the splines are traversed between the blocks, $e, e,$ fastened to the stands Z, Z. The front ends of the traverse rods are provided with female screws, to which the file holders $f, f,$ are fitted and are held in the position required by screwing the nuts $g, g,$ on the file holders, against the ends of the traverse rods. These file holders are made of metal and thin enough to spring and let the files $h, h,$ slip over or by the teeth of the saws as they are turned in the process of filing. The file holders are provided with open clasps $i, i,$ so constructed as to hold the files $h, h,$ firmly (without covering their marking edges or corners) when said clasps are fastened by the wedges $k, k,$ driven between the clasps $i,$ and file holders $f, f,$ as shown in Fig. 2.

To turn the saws while they are being filed with a proper motion I fasten the cone of pulleys $l,$ to the shaft S, which carries the band $m,$ to drive the cone $n,$ and shaft $p,$ which turns in boxes fastened to the posts D, D, and turn the pulley $q,$ which carries the band $r,$ and turns the pulley $s$ and upright shaft S, which turns in boxes fastened to the bar F and rail G. The upright shaft S, has the screw $t,$ fastened on it, which drives the gear $t',$ and shaft $t^2,$ which shaft turns in boxes fastened to the bars F, and carries the pulley $u,$ shown in Fig. 1 by broken lines. This pulley $u,$ carries the band $u',$ which is applied on the teeth of the saws E', E', to rotate the saw cylinder while the saws are being filed. The pulley $u,$ may be moved on the shaft $t^2,$ so as to apply the belt $u',$ to the saws either side of the files, and I prefer to remove the sharp cut of the files with a hone before applying them to the saws.

The machine having been constructed and completed as above described and the saw cylinder arranged in its proper place with the belt on the saws, and the files clamped to the holders as above described, and adjusted to a proper height to suit the teeth of the saws by turning the screw $Q^2,$ and the files brought against the teeth of the saw by traversing the machine on the ways C, C, and adjusting the stands Z Z for that purpose, the machine may be set at work by turning the pin Z', in the pulley T, when the files will act on the backs of the saw teeth most, as the saws are turned by the belt $u',$ with a continuous motion, the file holders $f, f,$ yielding or springing, so as to let the files slip over the teeth and pass from one score into the next, the belt $m,$ being so arranged on the cones $l,$ and $n,$ as to turn the saws at a proper speed to allow the files to give each of the teeth in the saws the required number of strokes to sharpen them. When one side of each of the two saws acted upon are completed, the files may be lifted clear of the saws by raising the vibrating frame and traversing the machine, so as to apply the files to the next two saws, and so on to all the saws in succession until they are sharpened, when the saw cylinder may be removed to the cotton gin.

I contemplate that the supports of the saw cylinder may be arranged to traverse and allow the filing machine to stand stationary which will be equivalent to traversing the filing machine. I propose this arrangement more especially where other than hand power is used for driving the machine.

The advantages and improvements of my invention may be enumerated as follows: The saws can be sharpened or repointed in one third of the time required to do it by hand and in a much better manner; consequently for less expense in time and money. The whole machine, including track and supports for cylinder, will not weight over one hundred and fifty pounds, and being light and portable can be carried to the gin house, where the cylinder of any gin (in the hands of an expert operator) can be repointed without making it necessary to suspend ginning for more than one day. A boy ten years of age has power sufficient to operate the machine.

I believe that I have described and represented my invention and improvements, so as to enable any person skilled in the art to make and use them. I will now state what I desire to secure by Letters Patent.

I claim—

1. Giving the files a reciprocating rotary or rolling motion by devices substantially such as are herein described or their equivalents for the purposes set forth in the foregoing specification.

2. I claim the adjustable vibrating frame carrying the traverse rods which operate the files, when arranged to vibrate parallel with the plane of the saws, so as to adjust and adapt the files to the saws as described.

3. I claim giving the saws a continuous rotary motion while they are operated upon by the files by means of a belt applied directly upon the saw cylinders.

4. I claim a yielding or spring file holder in combination with a traversing rod having a reciprocating rolling motion.

JONATHAN T. TURNER.

Witnesses:
LAFAYETTE KEITH,
JOSHUA E. CRANE.